United States Patent [19]
Tamura et al.

[11] Patent Number: 4,969,102
[45] Date of Patent: Nov. 6, 1990

[54] SYSTEM FOR CONTROLLING ROTATION OF DRIVE WHEEL FOR VEHICLES AND METHOD THEREFOR

[75] Inventors: Minoru Tamura; Shinji Katayose; Toru Iwata, all of Kanagawa, Japan

[73] Assignee: Nissan Motor Company, Limited, Yokohama, Japan

[21] Appl. No.: 274,357

[22] Filed: Nov. 21, 1988

[30] Foreign Application Priority Data

Dec. 22, 1987 [JP] Japan .................. 62-324525

[51] Int. Cl.$^5$ .............................................. B60K 41/20
[52] U.S. Cl. .................. 364/426.03; 180/197; 303/102
[58] Field of Search ............ 364/426.02; 180/197; 303/97, 100, 102

[56] References Cited

U.S. PATENT DOCUMENTS

| 4,685,547 | 8/1987 | Ohashi et al. ............ 192/3 R |
| 4,721,176 | 1/1988 | Kabasin et al. ............ 180/197 |
| 4,733,760 | 3/1988 | Inagaki et al. ............ 192/3 R |
| 4,765,430 | 8/1988 | Schulze et al. ............ 180/197 |
| 4,788,644 | 11/1988 | Inagaki ............ 364/426.03 |
| 4,811,808 | 3/1989 | Matsumoto et al. ............ 180/197 |
| 4,843,552 | 6/1989 | Inagaki ............ 364/426.03 |
| 4,850,656 | 7/1989 | Ise et al. ............ 303/100 |
| 4,866,618 | 9/1989 | Tamura et al. ............ 364/431.03 |

FOREIGN PATENT DOCUMENTS

3618867 A1 12/1986 Fed. Rep. of Germany .
3625945 A1 2/1987 Fed. Rep. of Germany .
3722088 A1 1/1988 Fed. Rep. of Germany .

Primary Examiner—Thomas G. Black
Attorney, Agent, or Firm—Foley & Lardner, Schwartz, Jeffery, Schwaab, Mack, Blumenthal & Evans

[57] ABSTRACT

A system and method for controlling a rotation of drive wheels for a vehicle in which a slippage (slip rate in percentage) between the drive wheels and a road surface on which the vehicle runs is calculated on the basis of a drive wheel rotation speed and a vehicle body speed, a plurality of different predetermined slippages, each representing a magnitude of a slip occurrence are stored, and a plurality of different characteristic graphs, each representing a relationship between opening angles of a first throttle valve associated with an accelerator and of a second throttle valve installed in series with the first throttle valve in an intake air passage of a vehicular engine are stored. Then, one of the characteristic graphs is selected to use the control of the opening angle of the throttle valve according to a change of the slip occurrence in such a way that when the slippage increases and exceeds one of the predetermined slippages, the opening angle of the second throttle valve is decreased toward its fully close position with respect to that of the first throttle valve and when the slippage decreases and becomes below one of the predetermined slippages, the opening angle of the second throttle valve is increased with time toward its original fully open position.

14 Claims, 9 Drawing Sheets

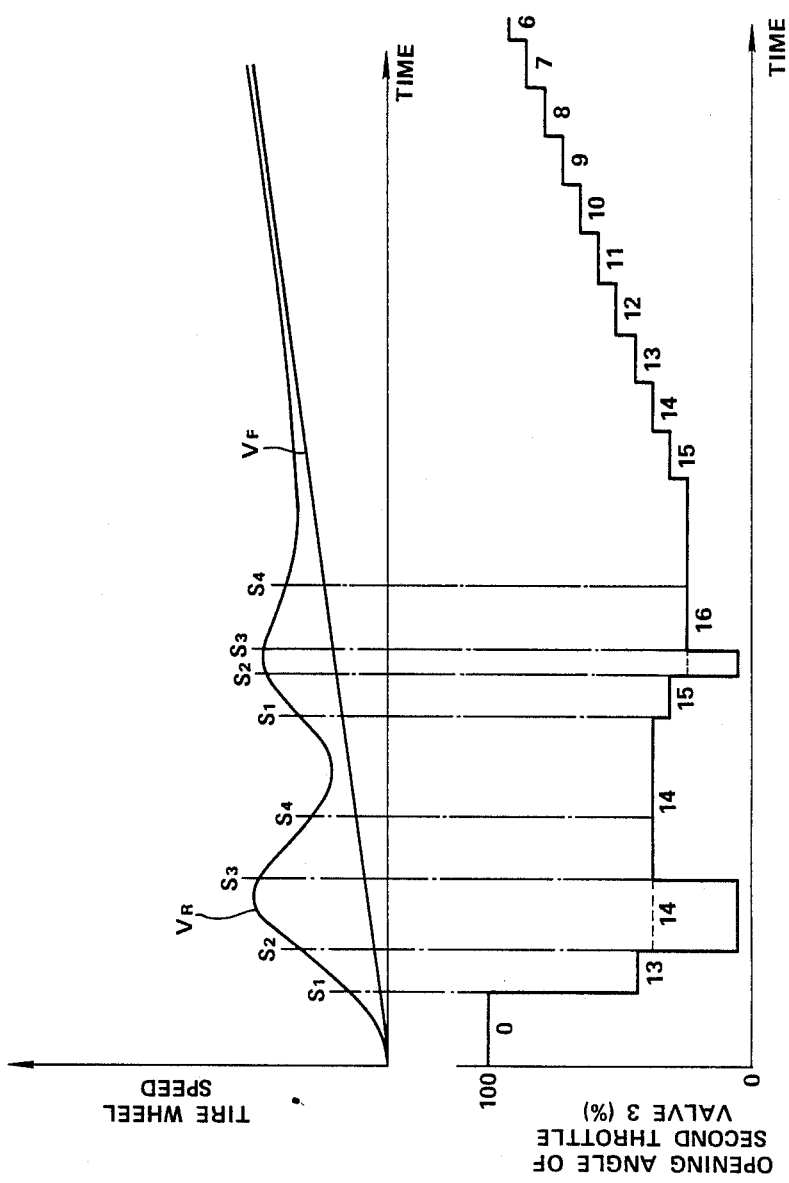

SYSTEM FOR CONTROLLING ROTATION OF DRIVE WHEEL FOR VEHICLES AND METHOD THEREFOR

BACKGROUND OF THE INVENTION

(1) Field of the Invention

The present invention relates to a system and method for controlling rotation of a drive wheel for a vehicle. The present invention relates particularly to the system and method for controlling rotation of a drive wheel for a vehicle in which a slippage (slip rate in percentage) is calculated between a drive wheel and road surface during a vehicle run and controlling rotation of the drive wheel so as to increase a frictional force on both drive wheel and road surface.

(2) Background of the Art

In general, various kinds of driving force controlling systems applicable to vehicles have been proposed in which during a vehicle acceleration an optimum driving force is applied to a drive wheel without occurrence of slip.

In such kinds of driving force controlling systems, a rotation speed of the drive wheel at the time of the vehicle acceleration is controlled so as to become slightly higher than a running speed of the vehicle so that a frictional force between the drive wheel and road surface becomes maximum. That is to say, in a case where a so-called slippage derived from a difference between the speed of the drive wheel and the speed of the vehicle body is approximately from 10% to 20%, the frictional force becomes maximum. A side force against a side skid of a vehicle body indicates an appropriate value so that a maximum acceleration characteristic and vehicle body stability can be achieved.

One of such kinds of driving force controlling systems is exemplified by a Japanese Patent Application First Publication (Tokkai) sho No. 61-60331 published on Mar. 28, 1986.

In the above-identified Japanese Patent Application Publication, the means for controlling the rotational speed of the drive wheel includes a first throttle valve whose opening angle is adjusted in accordance with an accelerator pedal depression, a second throttle valve located downstream or upstream of the first throttle valve, and means for adjusting an opening angle of the second throttle valve, so that the rotation of the drive wheel is controlled according to the opening angle of the first throttle valve.

However, since, in the previously proposed driving force controlling system, the opening angle of the second throttle valve is adjusted merely in accordance with a slip state of the vehicle, the vehicle only returns to an originally possible slip state which is before the avoidance of the slip. Therefore, the system is susceptible to the occurrence of a similar slip. In addition, during control of the slip prevention, a corresponding relationship between the operation of the accelerator pedal and driving force of the engine becomes lost so that an unmatched feeling for the operation of the accelerator pedal with respect to the driving force is given to the vehicle driver.

SUMMARY OF THE INVENTION

It is an object of the present invention to provide a system and method for controlling a driving force for a vehicle by means of which no more slip occurs after avoidance of the slip.

The above-described object can be achieved by providing a system for controlling rotation of drive wheels for a vehicle, comprising: (a) first means for detecting a first speed of the drive wheels of the vehicle; (b) second means for detecting a second speed of a vehicle body of the vehicle; (c) third means for calculating a slip rate in percentage (slippage) between the drive wheels and a road surface on which the vehicle runs from the detected first and second speeds; (d) fourth means for setting and storing a plurality of different characteristic graphs, each representing a relationship between a first controlled variable of a first engine driving force adjusting mechanism of a vehicular engine which is varied according to a controlled variable of a vehicular accelerator and a second controlled variable of a second engine driving force adjusting mechanism of the vehicular engine; (e) fifth means for setting and storing a plurality of different predetermined slippages, each indicating a magnitude of a vehicle slip occurrence of the drive wheels against the road surface; (f) sixth means for transferring and selecting any one of the characteristic graphs of the fifth means depending on whether the calculated slippage increases and exceeds one of the predetermined slippages in such a way that the second controlled variable of the second driving force adjusting mechanism is decreased with respect to the first controlled variable whenever the slippage increases and exceeds one of the predetermined slippages and in such a way that the second controlled variable is increased with time with respect to the first controlled variable whenever the slippage in turn decreases and becomes below one of the predetermined slippages; and (g) seventh means for controlling the second controlled variable of the second driving force adjusting mechanism on the basis of the selected characteristic graph.

The above-described object can also be achieved by providing a system for controlling rotation of drive wheels for a vehicle, comprising: (a) first means for detecting a first speed of the drive wheels of the vehicle; (b) second means for detecting a second speed of a vehicle body; (c) third means for calculating a slip rate (slippage) between the drive wheels and a road surface on which the vehicle runs from the detected first and second speeds; (d) forth means for setting and storing a plurality of different characteristic graphs, each representing a relationship between an opening angle of a first throttle valve installed in an intake air passage of a vehicular engine which is varied according to a depression angle of an accelerator of the vehicle and an opening angle of a second throttle valve installed in series with the first throttle valve; (e) fifth means for setting and storing a plurality of different predetermined slippages, each representing a magnitude of the slip occurrence; (f) sixth means for transferring and selecting one of the characteristic graphs depending on whether the calculated slippage increases and exceeds one of the predetermined slippages in such a way that the opening angle of the second throttle valve is largely decreased with respect to the opening angle of the first throttle valve whenever the slippage increases and exceeds the predetermined slippage and in such a way that the opening angle of the second throttle valve is stepwise increased with time whenever the calculated slippage is decreased and becomes below one of the predetermined slippages; and (g) seventh means for controlling the opening angle of the second throttle valve on the basis of the selected characteristic graph so that a frictional force between the drive wheels and road surface becomes maximum.

The above-described object can also be achieved by providing a method for controlling rotation of drive wheels for a vehicle, comprising the steps of: (a) detecting a first speed of the drive wheels of the vehicle; (b) detecting a second speed of a vehicle body; (c) calculating a slippage (slip percentage) between the drive wheels and a road surface on which the vehicle runs from the detected first and second speeds; (d) setting a plurality of different characteristic graphs each representing a relationship between a first controlled variable of a first engine driving force adjusting mechanism of a vehicular engine which is varied according to a controlled variable of an accelerator of the vehicle and a second controlled variable of a second engine driving force adjusting mechanism of the vehicular engine; (e) setting a plurality of different predetermined slippages each representing a magnitude of the slippage; (f) selecting one of the characteristic graph depending on whether the calculated slippage increases and exceeds one of the set predetermined slippages in such a way that the second controlled variable is decreased with respect to the first controlled variable whenever the slippage increases and exceeds one of the set predetermined slippages and in such a way that the second controlled variable is increased with time with respect to the first controlled variable whenever the calculated slippage in turn decreases and becomes below one of the predetermined slippages; and (g) controlling the second controlled variable of the second driving force adjusting mechanism on the basis of the selected characteristic graph.

BRIEF DESCRIPTION OF THE DRAWINGS

FIG. 6 is a characteristic graph of relationships between the tire wheel speed, change in the slippage, and change in the opening angle of a second throttle valve.

DETAILED DESCRIPTION OF THE PREFERRED EMBODIMENT

Reference will hereinafter be made to the drawings in order to facilitate understanding of the present invention.

Figure 1:
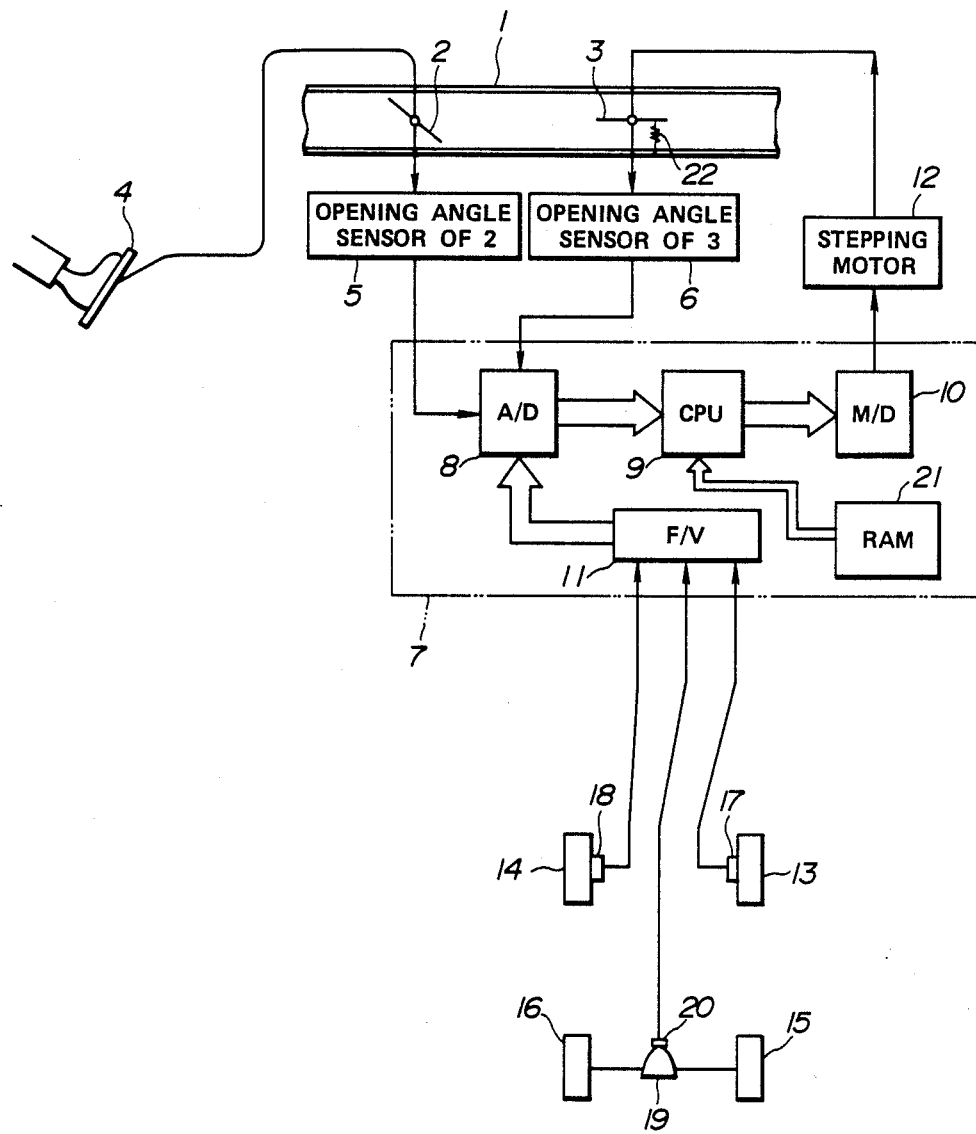
FIG. 1 is a schematic circuit block diagram of a system for controlling a driving force for a vehicle in a preferred embodiment according to the present invention.

FIG. 1 shows a preferred embodiment of a system for controlling a driving force applicable to a vehicle.

In FIG. 1, numeral 1 denotes an intake air passage supplying fuel to an engine cylinder(s). First and second throttle valves 2 and 3 are disposed in series in the intake air passage 1.

The second throttle valve 3 may be placed downstream or upstream of the first throttle valve 2.

A vehicle driver can depress an accelerator pedal 4 linked to the first throttle valve 2 for adjusting an opening angle of the first throttle valve 2.

A throttle sensor 5 is connected to a control unit 7 for detecting the opening angle of the first throttle valve 2 and outputting a signal indicative thereof to the control unit 7. Another throttle sensor 6 is also connected to the control unit 7 for detecting the opening angle of the second throttle valve and outputting a signal indicative thereof to the control unit 7.

The control unit 7 determines the opening angle of the second throttle valve 3. The control unit 7 includes a microcomputer having an analog-to-digital (A/D) converter 8, a Central Processing Unit (CPU) 9, a motor drive circuit 10, a frequency-to-voltage (F/V) converter 11, and a storage circuit (RAM) 21, and a common bus. A stepping motor 12 is connected between the second throttle valve 3 and the motor drive circuit 10 for controlling the opening angle of the second throttle valve 3 in accordance with a drive signal derived from the motor drive circuit 10 as will be described later.

It is noted that a spring 22 is extended between a valve portion of the second throttle valve 3 and a wall of the corresponding intake air passage 1 for biasing the second throttle valve 3 toward its fully open position.

On the other hand, the vehicle includes a right front wheel 13, a left front wheel 14, right rear wheel 15, left rear wheel 16, and a differential gear 19. The front wheels 13 and 14 constitute driven wheels and the rear wheels 15 and 16 constitute drive wheels. A right driven wheel rotation sensor 17 is installed on the right front wheel 13 and a left driven wheel rotation sensor 18 is installed on the left front driven wheel 14.

A drive shaft rotation sensor 20 is provided on the differential gear 19 as means for detecting a drive wheel speed. The number of the revolutions per time of the drive wheels 15 and 16, i.e., the drive wheel speed is detected by means of the drive shaft rotation sensor 20.

The detected signals of the left driven wheel rotation sensor 17, the right driven wheel rotation sensor 18, and the drive shaft rotation sensor 20 are inputted to the frequency-to-voltage (F/V) converter 11 in the control unit 7. The F/V converter 11 converts each signal into a corresponding voltage signal and thereafter the A/D converter 8 converts the voltage signal into a corresponding digital signal. The converted digital signal is then inputted to the CPU 9. The CPU 9 calculates a target value of the opening angle of the second throttle valve 3 on the basis of stored information in the storage circuit (RAM) 21 to be described later and input signals thereof and outputs a drive command signal to the motor drive circuit 10. The motor drive circuit 10 outputs the drive signal corresponding to the target opening angle inputted from the CPU 9 to the motor 12 so as to drive the motor 12. The driving force of the stepping motor 12 causes the second throttle valve 3 to open or close so that the engine output is controlled.

Next, actual open or close control of the second throttle valve 3 will be described in greater details with reference to FIGS. 2 (A) to 3.

Figure 2:
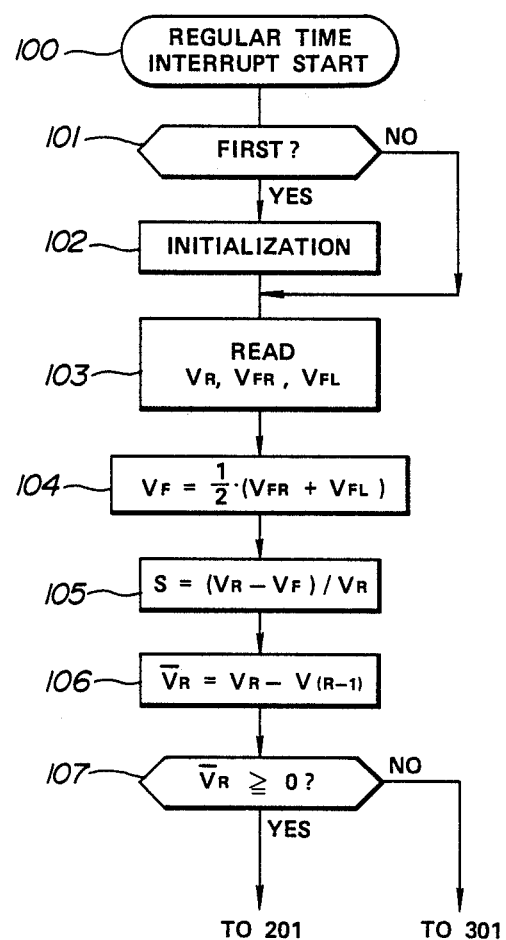
FIGS. 2 (A) to 2 (E) are integrally an operational flowchart of the driving force controlling system shown in FiG. 1.
Figure 2:
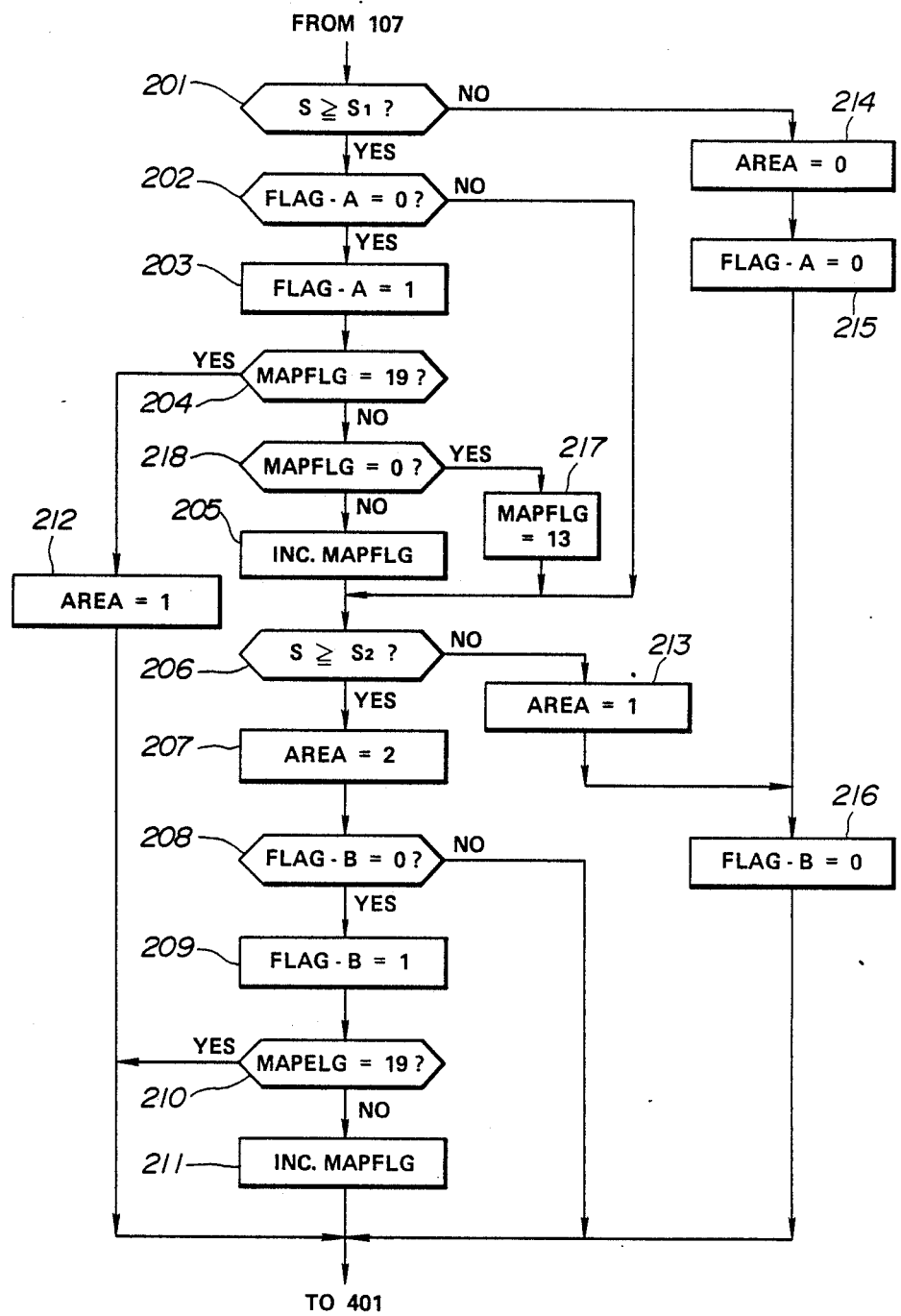
Figure 2:
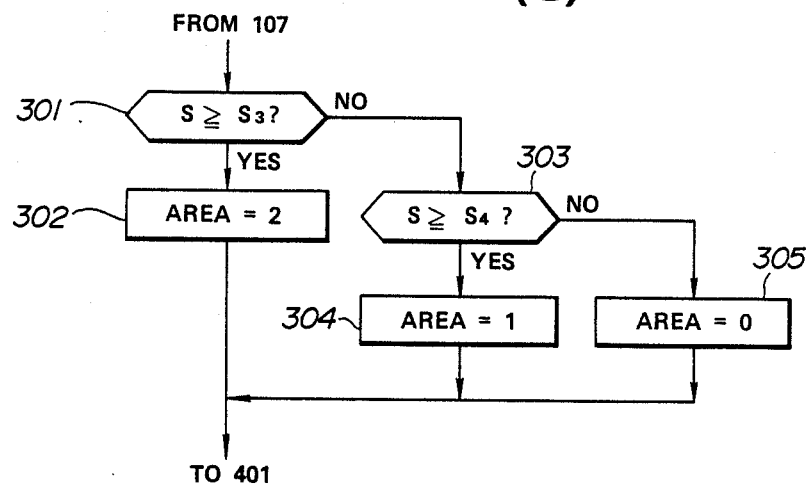
Figure 2:
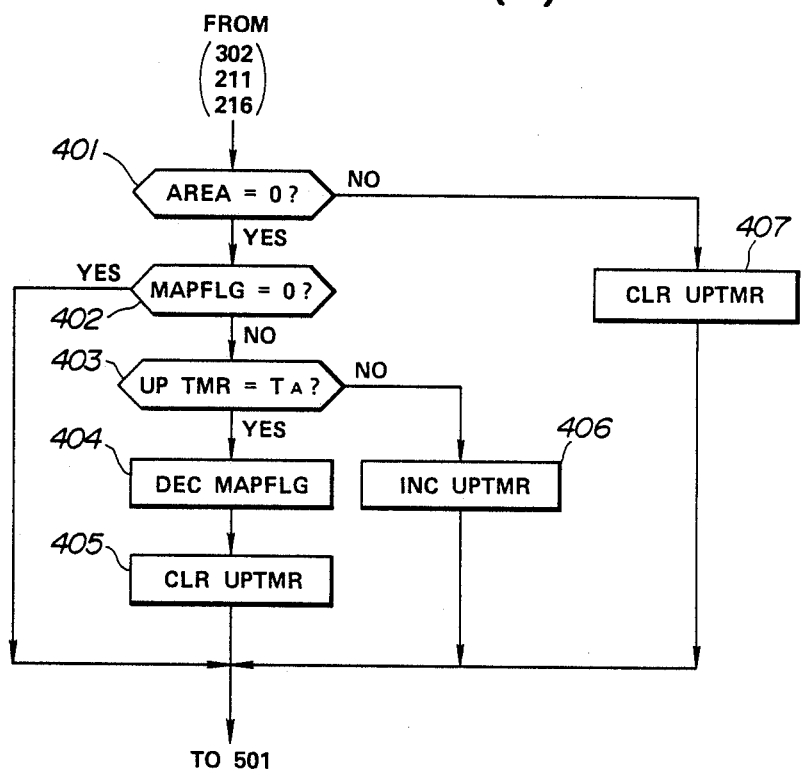
Figure 2:
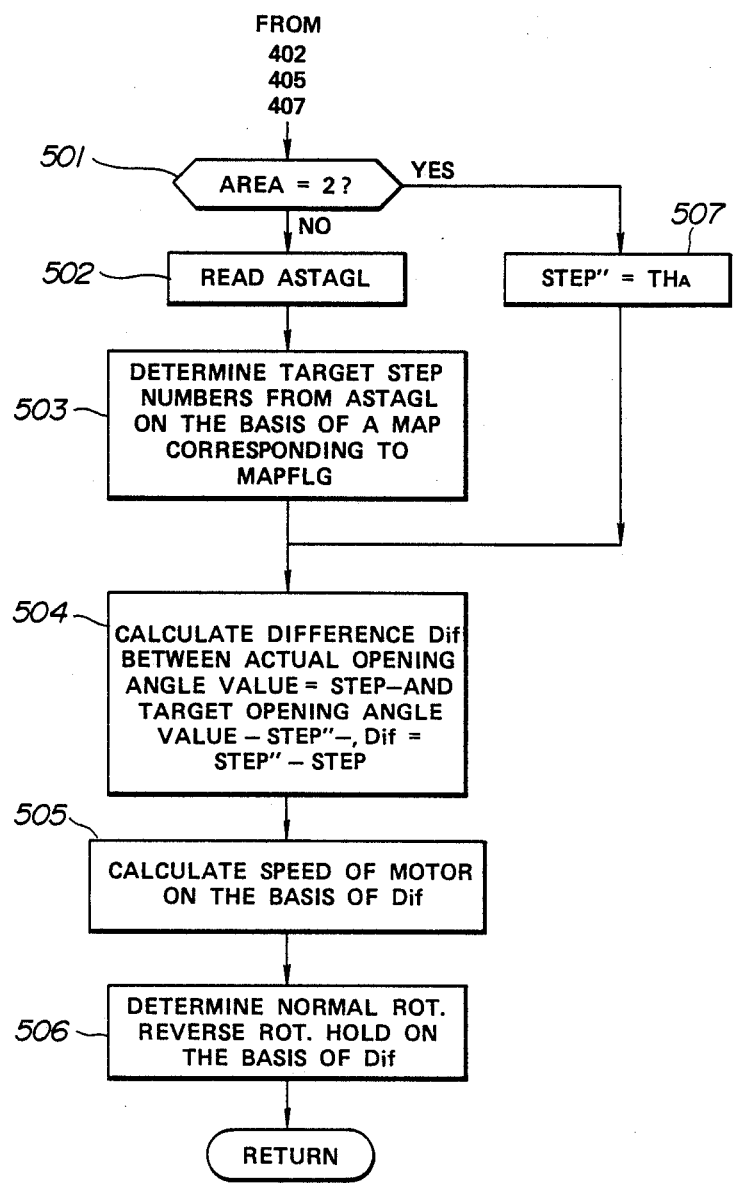
Figure 3:
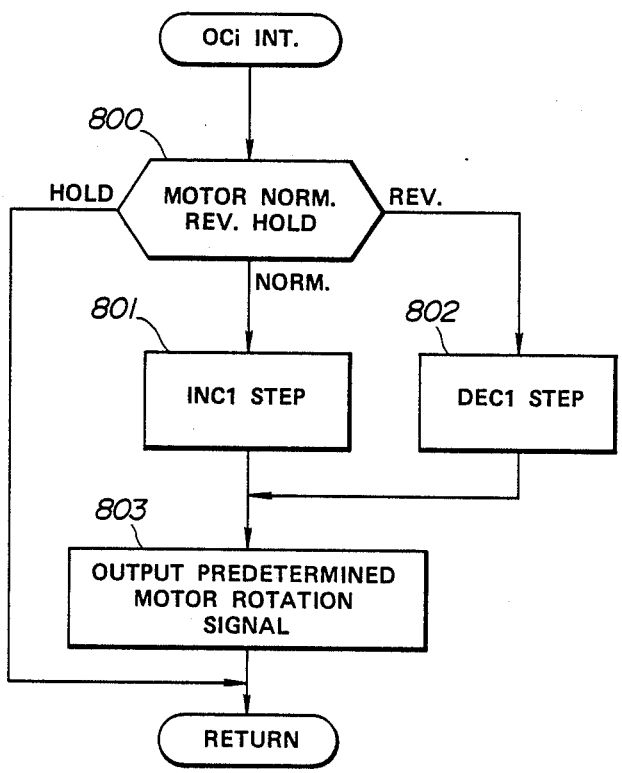
FIG. 3 is an operational flowchart of a motor driving section of the driving force controlling system shown in FIG. 1.

A series of processes executed in a main routine shown in FIGS. 2 (A) to 2 (E) are a regular time interrupt routine driven for each predetermined period (for example, 20 msec.). A series of processes executed in a subroutine shown in FIG. 3 is an OCI (Output Compare Interrupt) interrupt routine whose execution start time is determined by the constant time interrupt and driven properly in the main routine according to the signal output period to the stepping motor 12.

In FIG. 2 (A), when an engine key of the vehicle is inserted into a key hole and an ignition switch is turned on, a power supply of the microcomputer is turned on so that the regular time interrupt routine shown in FIGS. 2 (A) to 2 (E) is started from a step 100. Then, in the step 101, the control unit 7 determines whether this is a first flow after the power supply is turned on. If this is the first time to execute this routine, a start signal is issued to initialize the control unit 7 such as clearing of the RAM 21. It is noted that if this is not the first flow, the initialization processing is omitted and the routine immediately goes to a step 103.

In the step 103, the control unit 7 reads a rotation speed $V_R$ of the drive shaft (=rotational speed of the left and right drive wheels) detected by means of the drive shaft rotation sensor 20, a rotation speed $V_{FR}$ detected by the right driven wheel rotation sensor 17, and the rotation speed $V_{FL}$ detected by the left driven wheel rotation sensor 18.

In a step 104, the control unit 7 calculates a rotation speed $V_F$ of the driven wheels 13, 14 from the values of $V_{FR}$ and $V_{FL}$ read in the step 103 as follows:

$$V_F = (V_{FR} + V_{FL})/2$$

That is to say, the control unit calculates the rotation speed $V_F$ as an average value of both rotational speeds $V_{FR}$ and $V_{FL}$.

In general, the average value $V_F$ of both rotation speeds $V_{FR}$ and $V_{FL}$ of the driven wheels 13, 14 coincides with a vehicle body speed.

In a step 105, the control unit 7 calculates the slippage S between the drive wheel tires and road surface form the average value $V_F$ and rotation speed $V_R$ of the drive wheels 15, 16. That is to say, $S = (V_R - V_F)/V_R$ In a step 106, a rate of change of the rotation speed $\overline{V}_R$ is calculated from the present rotation speed $V_R$ and the rotation speed $V_{(R-1)}$ one previous control cycle in the following way.

$$\overline{V}_R = V_R - V_{(R-1)}$$

In a step 107, the control unit 7 determines whether the $\overline{V}_R$ is equal to or more than zero ($\overline{V}_R \geq 0$). If $\overline{V}_R$ is equal to or more than zero ($\overline{V}_R \geq 0$), the routine goes to a step 201 of FIG. 2 (B). If $\overline{V}_R$ is less than zero $\overline{V}_R < 0$ in the step 107, the routine goes to a step 301 of FIG. 2 (C).

In FIG. 2 (B), in the step 201, the control unit 7 determines whether the slippage S derived in the step 201 is larger than a first set value $S_1$ (for example, $S_1 = 0.1$). If the slippage S is larger than $S_1$, the routine goes to a step 202. If the slippage S is smaller than $S_1$, the routine goes to a step 214.

Next, in the step 202, the control unit 7 determines whether a flag A is set. If not set (flag A=0), the routine goes to a step 203, in which the flag A is turned to 1 (flag A = 1). If set (flag A = 1) in the step 202, the routine goes to a step 206. That is to say, in a case where the slippage S is increased from a value lower than $S_1$ and exceeds $S_1$, a so-called mapping page increment processing is once executed as will be described later. In the preferred embodiment, twenty kinds of opening angle characteristic maps are prepared. The numbers of pages are allocated to the twenty kinds of the opening angle characteristic graphs in such a sequence of the wider opening angle of the second throttle valve 3 as page 0, page 1, page 2, page 3, ---, page 18, and page 19.

In the following description, the number of the page of the opening angle characteristic maps (page No.) corresponds to an indicated value of an opening angle characteristic map flag MAPFLG.

In a step 204, the control unit 7 determines whether an indicated value of the opening angle characteristic map flag MAPFLG is 19, i.e., whether one of the opening angle characteristic maps indicates page 19. If MAPFLG=19 in the step 204, the map page increment control is not carried out and immediately the routine goes to a step 212. If MAPFLG≠19, the routine goes to a step 218. Then, the map page increment is carried out. If the control unit 7 determines that the map flag MAPFLG is zero (0) in the step 218, the routine goes to a step 217 in which the map flag MAPFLG is set to indicate 13.

On the other hand, if the map flag MAPFLG is not zero in the step 218, a normal mapping page increment (in this example, one page) is carried out in a step 205. The map page increment processing is a processing in which 1 is added to the map flag MAPFLG, i.e., the opening angle characteristic map is selected to be one whose number of pages is such that one is added to the original number of pages.

In a step 206, the control unit 7 determines whether the slippage S is (equal to or) greater than a second set value $S_2$ (=0.2) which is larger than $S_1$ (=0.1). If S is equal to or greater than the set value $S_2$, the routine goes to a step 207. If S is less than $S_2$, the routine goes to a step 213.

In the step 207, the control unit 7 defines a slippage area AREA as 2 and carries out the map page increment processing in steps subsequent to the step 208. The slippage area AREA 2 denotes an enclosed region in which the rate of change in the rotation speed $\overline{V}_R$ of the drive wheels 15, 16 is equal to or more than zero ($\overline{V}_R \geq 0$) and S is equal to or more than $S_2$ ($S \geq S_2$).

Next, in steps 208, 209, 210, and 211, the same series of processings are carried out as in the steps 202, 203, 204, and 205 for a flag B. That is to say, in a case where the slippage S is increased from a value lower than $S_2$ and thereafter exceeds $S_2$, the map page increment processing is once carried out.

On the other hand, in the step 213, the slippage area AREA is defined as 1 which is $\overline{V}_R$ is equal to or more than zero ($\overline{V}_R \geq 0$) and $S_1 \leq S < S_2$. Then, in a step 216, a flag B is cleared. Furthermore, in the step 214, the slippage area AREA is defined as 0 (AREA=0) in which $\overline{V}_R \geq 0$ and $S < S_1$. Then in a step 215, the flag A is cleared. Then, the routine goes to the step 216.

In FIG. 2 (C), the series of processes in a case where $\overline{V}_R < 0$ will be described.

That is to say, in a step 301, the control unit 7 determines whether the slippage S is larger than a third set value $S_3$ (for example, $S_3 = 0.3$). If $S \geq S_3$, the routine goes to a step 302 in which the slippage area AREA is defined as 2 in which $\overline{V}_R < 0$ and $S \leq S_3$. Then, the routine goes to a step 401 in FIG. 2 (D).

If $S < S_3$ (No) in the step 301, the routine goes to a step 303 in which the control unit 7 determines whether the slippage S is equal to or greater than a fourth set value $S_4$ (for example, $S_4 = 0.1$).

If $S \geq S_4$ in the step 303, the routine goes to a step 304 in which the slippage area AREA is defined as 1 in which $\overline{V}_R < 0$ and $S_4 < S \leq S_3$. If $S < S_4$, the routine goes to a step 305 in which the slippage area AREA is defined as 0 in which $\overline{V}_R < 0$ and $S < S_4$. Then, the routine goes to a step 401 in the same way as in the step 304.

Figure 5:
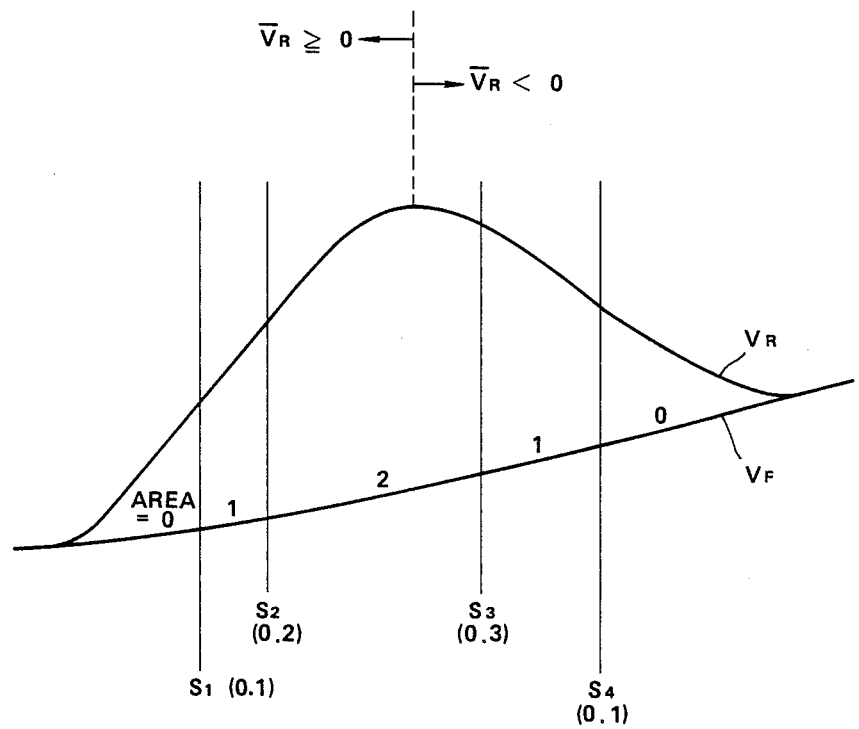
FIG. 5 is a characteristic graph of a relationship between a slippage (slip percentage), a rate of change in a drive wheel speed $\overline{V}_R$, and set values of slippage S.

FIG. 5 shows a characteristic graph of relationships between the set values $S_1$, $S_2$, $S_3$, and $S_4$ of the slippages, slippage areas AREA 0, AREA 1, and AREA 2, and rotation speeds $V_R$ and $V_F$. The values of $S_1$ to $S_4$ indicate inversed hysterisis characteristics such that with the response delay of the engine taken into account the detection speed of the slip is increased and its compensation speed is increased.

In FIG. 2 (D), the control unit 7 determines whether the slippage area AREA is zero or not in the step 401 (AREA=0). If AREA=0, i.e., either $\overline{V}_R \geq 0$ and $S \leq S_1$ or $\overline{V}_R < 0$ and $S \leq S_4$, the routine goes to a step 402 to exectute a map page decrement control.

In details, in the step 402, the control unit 7 determines whether the opening angle characteristic map flag MAPFLG is zero or not. If MAPFLG=0, the routine goes to a step 501 since the second throttle valve 3 is fully open. If MAPFLG≠0, the control unit 7 determines whether a value of an upper timer UP TMR is equal to a set value $T_A$ corresponding to an interval time for incrementing maps (a value corresponding to, e.g., 100 to 200 msec.). If UP TMR = $T_A$, the routine goes to a step 404 in which the map flag MAPFLG is decremented, i.e., the opening angle characteristic map flag is subtracted by 1 and goes to a step 405 in which the up timer UP TMR is cleared (UP TMR = 0).

If UP TMR≠$T_A$, the routine goes to a step 406 in which a map page decrement processing is not carried out but the up timer is incremented by one (Inc. UP TMR) and goes to the step 501.

Next, in the step 501 shown in FIG. 2 (E), the control unit 7 determines whether the slippage area AREA is 2. If the area AREA is 2, i.e., the vehicle runs under a large slip occurrence condition, the routine goes to a step 507 in which a target value STEP* of the opening angle of the second throttle valve 3 is not dependent on the opening angle characteristic map flag MAPFLG but selected from a predetermined value $TH_A$ (for example, a value corresponding to an opening angle 5% of the throttle valve 3). Then, the routine goes to a step 504. In addition, if the area AREA of the slippage is not 2 in the step 501 (MAPFLG≠2), to select the target value STEP* of the second throttle valve 3 based on the opening angle characteristic map flag MAPFLG, the control unit 7 reads an opening angle (ASTAGL) of the first throttle valve 2 in a step 502. Then, the control unit 7 in a step 503 searches for the target opening angle of the second throttle valve 3 from the read opening angle ASTAGL of the first throttle valve 2 on the basis of the opening angle characteristic map corresponding to the map flag MAPFLG so as to determine the target opening angle value STEP*.

On the other hand, a difference $D_{if}$ between the target opening angle value STEP* of the second throttle valve 3 determined in the step 503 or in the step 507 and the actual opening angle value STEP derived from the opening angle sensor 6 is calculated as follows: $D_{if} =$ STEP* − STEP.

Furthermore, the control unit 7 determines a motor speed on the basis of the difference $D_{if}$ in steps 505 and 506, determines the normal directional rotation, reverse directional rotation, and holding, sets a period of OCI interrupt, and carries out a flag set indicating the motor direction, etc..

FIG. 3 shows the OCI interrupt routine.

In a step 800, the control unit 7 determines whether the condition of the stepping motor 12 should be held or should be rotated in the normal/reverse direction. At this time, in a case where the normal direction rotation is determined, 1 is added to the actual opening angle value STEP in a step 801. If the reverse direction rotation is determined, 1 is subtracted from the actual opening angle value STEP of the second throttle valve 3. If holding is determined, the actual opening angle value STEP remains the same.

In a step 803, the motor rotation signal corresponding to 1 STEP in response to a command in the step 800 is outputted to the motor drive circuit 10 so that the stepping motor 12 is driven. Therefore, in a step 803, the motor rotation signal corresponding to 1 STEP is outputted to the motor drive circuit 10 in response to the command in the step 800 so as to drive the motor 12. The second throttle valve 3 within the intake air passage 1 shown in FIG. 1 is rotated through an angle corresponding to 1 STEP. The OCI interrupt routine shown in FIG. 3 is repeated so that the second throttle valve 3 is pivoted through the target angle.

Figure 4:
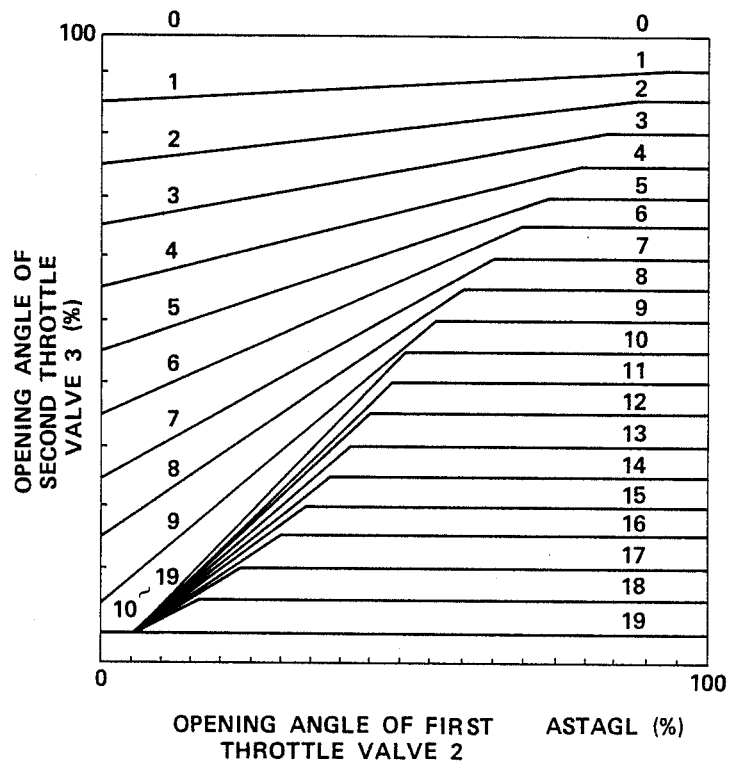
FIG. 4 is a characteristic graph of a relationship between an opening angle of a second throttle valve and acceleration stroke of an accelerator pedal.

FIG. 4 shows one example of the opening angle characteristic maps determining the relationships between the acceleration stroke angle ASTAGL of the first throttle valve 2 and opening angle of the second throttle valve 3 (in percentage in FIG. 4).

In FIG. 4, pages 0 to 19 correspond to map flags MAPFLGs, each flag corresponding to one of the page numbers from 0 to 19 of the opening angle characteristic maps. The map of page 0 is an opening angle characteristic map not dependent on the opening angle ASTAGL of the first throttle valve 2 but setting the opening angle of the second throttle valve 3 as a fully open angular position. The map of page 19 is not dependent on the opening angle ASTAGL of the first throttle valve 2 but sets the opening angle ASTAGL of the second throttle valve 3 as 5%. For the maps from page 1 to page 18, until the opening angle ASTAGL of the first throttle valve 2 reaches a certain threshold value, the opening angle of the second throttle valve 3 is increased according to the opening angle ASTAGL of the first throttle valve 2. When the opening angle ASTAGL of the first throttle valve 2 exceeds this threshold value, the opening angle of the second thresold valve 3 is held constant (not dependent on the opening angle ASTAGL of the first throttle valve 2). As the map page indicates in an order from 0 to 19, i.e., the map flag MAPFLG becomes greater, the thresold value becomes smaller. The thresold value is set so that the opening angle ASTAGL of the second throttle valve 3 becomes smaller with respect to the opening angle ASTAGL of the first throttle valve 2 as shown in FIG. 4.

The actual operation example will be described below with the flowcharts shown in FIGS. 2 (A) to 3.

If the vehicle does not slip, i.e., the rate of change in the rotation speed of the drive wheels $\overline{V}_R \geq 0$ and $S_1 > S \geq 0$, the control flow is advanced as follows: step 201 - 214 - 215 - 216 - 401 - 402. If the opening angle characteristic map flag MAPFLG is zero in the step 402, the routine goes immediately to the step 501. Thereafter, the control flow is advanced as follows: 502 - 503 - 504 - 505 - 506.

Next, if $\overline{V}_R \geq 0$ and $S_2 > S \geq S_1$, i.e., if the magnitude of slip on the vehicle increases and the slippage S starts to increase and exceeds $S_1$ from below $S_1$, the routine advances from the step 201 via the step 202 to the step 203. In the step 204, the control unit 7 determines whether the map flag MAPFLG is 19. When the map flag MAPFLG is determined to be 19, the map page increment or decrement is not carried out. If the map flag MAPFLG is not 19, the control unit 7 determines whether the map flag MAPFLG is zero in the step 218. If the map flag MAPFLG is zero, the map page increment is carried out with the map flag MAPFLG 13. The routine goes from the step 217 to the step 206. On the other hand, if the map flag MAPFLG is not zero, the normal map increment is carried out and the routine goes to a step 206. In the step 206, since $S<S_2$, the routine goes from the step 213 to the step 401 via the step 216. In the step 401, since the slippage area AREA is not zero, the control unit 7 determines that the vehicle is under the slip condition and carries out no map page increment. The routine advances from the step 407 to the step 501 and the same processing is carried out. Once the processing under the condition that $\overline{V}_R \geq 0$ and $S_2 > S \geq S_1$, the flag A=1 is set in the step 203. In the next interrupt processing, even though the condition that $\overline{V}_R \geq 0$ and $S_2 > S \geq S_1$ is continued, the routine advances from the step 202 directly to step 206. The map page increment is not carried out.

In addition, if $\overline{V}_R \geq 0$ and $S \geq S_2$, i.e., if the slippage S increases from a value below $S_2$ and exceeds $S_2$, the routine advances in such a route as 201 - 202 - 206 - 207 - 208 - 209. If in the step 210, the map flag MAPFLG is 19, the routine goes to the step 401. If MAPFLG is not 19, the routine goes to the step 211 in which 1 is added to MAPFLG and to the step 401. Then, the routine advances from the step 401 to such a route as steps 407 - 501 - 507 - 504 - 505 - 506. If once the slippage S exceeds $S_2$, the flag B=1 in the step 209. Therefore, even if the condition that $S \geq S_2$ is continued, the routine goes from the step 208 directly to step 208 so that the map decrement is not carried out.

Next, if $\overline{V}_R < 0$ and $S \geq S_3$, the routine advances in the following route: step 301 - 302 - 401 - 407 - 501 - 507 -504 - 505 - 506.

If $\overline{V}_R < 0$ and $S_3 > S \geq S_4$, the routine advances in the following route: step 301 - 302 - 401 - 407 - 501 - 502 - 503 - 504 - 505 - 506.

Furthermore, if $\overline{V}_R < 0$ and $S_4 > S \geq 0$, the routine advances in the following route: steps 301 - 303 - 305 - 401. Thereafter, the routine advances the step 501 in a case where the map flag MAPFLG is zero in the step 402. If not zero, the control unit 7 compares the value of the upper timer UP TMR with the set value $T_A$ corresponding to the map increment interval time. If both values do not coincide with each other, the routine goes from the step 406 to the steps 501 - 502 - 503 - 504 -505 - 506.

It is noted that although the slippages S are set as follows: $S_1=0.1$, $S_2=0.2$, $S_3=0.3$, and $S_4=0.1$ for convienence purposes, the set slippages are determined according to the vehicles and engines and may be varied.

FIG. 6 shows characteristic graphs of the tire wheel speed, the opening angle of the second throttle valve 3, and the change in the numbers of pages allocated to the opening angle characteristic maps as compared with the drive wheel speed $V_R$ and the change in the slippage S.

As appreciated from the foregoing description, in the driving force controlling system according to the present invention, the opening angle characteristic maps such that the opening angle of the second throttle valve 3 is determined by the stroke amount of the accelerator pedal 4 or the opening angle of the first throttle valve 2 are previously stored into the RAM 21, with the rotation speeds of the drive wheels 15, 16 and the driven wheels 13, 14 as parameters, the slippage S is calculated between the drive wheels 15, 16 and road surface. If the slippage S exceeds the preset slip values or are below the preset values, the opening angle of the second throttle valve 3 is stepwise controlled.

The stepping motor 12 may be replaced with a DC motor or servo motor.

The system according to the present invention may be used together with other systems such as an ignition timing controlling system, fuel injection rate controlling system, and/or brake controlling system.

Since the spring 22 is installed on the second throttle valve 3 as described above, the spring 22 serves as a fail safe structure for holding the second throttle valve 3 in the fully open position even though the control circuit 7 or stepping motor 12 fails, thereby the normal running state through the first throttle valve 2 being maintained.

As described hereinabove, the driving force controlling system according to the present invention does not only control the opening angle of the second throttle valve merely according to the slip occurrence but also carries out the driving force control such that the opening angle of the second throttle valve is reduced or increased with the opening angle characteristic maps transferred to either of the directions when the slippage exceeds the preset values or is below the present value. During the slip occurrence of the vehicle, the rotation of the drive wheels is controlled according to the opening angle of the second throttle valve so as to avoid the occurrence of slip. After the slip occurrence is avoided, the second throttle valve is stepwise returned to the original state. Therefore, the occurrence of the slip does not again occur.

In addition, since the opening angle of the second throttle valve 3 is controlled according to the depression rate to some degree even during the slip prevention control, the corresponding relationship between the accelerator pedal depression and engine driving force remains. Consequently, no unmatched feeling upon the depression of the accelerator pedal is given to the vehicle driver.

It will fully be appreciated by those skilled in the art that the foregoing description is made in terms of the preferred embodiment and various changes and modifications may be made without departing from the scope of the present invention which is to be defined by the appended claims.

What is claimed is:

1. A system for controlling rotation of drive wheels for a vehicle, comprising:
   (a) first means for detecting a first speed of the drive wheels of the vehicle;
   (b) second means for detecting a second speed of a vehicle body of the vehicle;
   (c) third means for calculating slippage between the drive wheels and a road surface on which the vehicle runs from the detected first and second speeds;
   (d) fourth means for storing numerical information which represents a plurality of different characteristic graphs, each of the graphs representing a relationship between a first controlled variable of a first engine driving force adjusting mechanism of a vehicular engine which is varied according to a controlled variable of a vehicular accelerator and a second controlled variable of a second engine driving force adjusting mechanism of the vehicular engine;

(e) fifth means for storing a plurality of different predetermined slippages, each indicating a magnitude of a vehicle slip occurrence of the drive wheels against the road surface;

(f) sixth means for selecting any one of the characteristic graphs of the fourth means depending on whether the calculated slippage increases and exceeds one of the predetermined slippages such that the second controlled variable of the second driving force adjusting mechanism is decreased with respect to the first controlled variable whenever the slippage increases and exceeds one of the predetermined slippages and such that the second controlled variable is increased with time with respect to the first controlled variable whenever the slippage in turn decreases and becomes below one of the predetermined slippages; and (g) seventh means for controlling the second controlled variable of the second driving force adjusting mechanism on the basis of the selected characteristic graph so that rotation of the drive wheels is controlled.

2. A system as set forth in claim 1, wherein the seventh means comprises: (a) eighth means for detecting the first controlled variable of the first driving force adjusting mechanism; (b) ninth means for detecting the second controlled variable of the second driving force adjusting mechanism; (c) tenth means for reading a target controlled variable of the second driving force adjusting mechanism from the selected characteristic graph with respect to the detected first controlled variable; (d) eleventh means for calculating a difference between the read target controlled variable and the detected controlled variable of the second driving force adjusting mechanism; (e) twelfth means for driving the second driving force adjusting mechanism on the basis of the calculated difference by the eleventh means so as to place the second driving force adjusting mechanism on the target controlled variable position.

3. A system as set forth in claim 2, wherein the first and second driving force adjusting mechanisms are first and second throttle valves installed in series with each other in an intake air passage of the vehicular engine and the controlled variables are opening angles of the respective throttle valves.

4. A system as set forth in claim 3, wherein the twelfth means includes a stepping motor linked with the second throttle valve.

5. A system as set forth in claim 3, wherein the plurality of characteristic graphs comprise a plurality of maps to each of which a page number is allocated in an order such that as the page number increases the opening angle of the second throttle valves decreases.

6. A system as set forth in claim 5, wherein the page number is allocated to each map in such an order that page 0 indicates that the opening angle of the second throttle valve is 100% with respect to its fully open position independently of the opening angle of the first throttle valve, page 1 to page 18 indicate that the opening angle of the second throttle valve is decreased in proportion to the opening angle of the first throttle valve until the opening angle of the first throttle valve is increased to a corresponding threshold value, and page 19 indicates that the opening angle of the second throttle valve is 5% with respect to its fully open position independently of the opening angle of the first throttle valve.

7. A system as set forth in claim 6, which further comprises thirteenth means for calculating a change rate of the first speed and wherein in a first case when the change rate of the first speed is equal to or above zero and the calculated slippage is below a first lowest predetermined slippage, the sixth means selects one of the maps at page 0, in a second case when the change rate of the first speed is equal to or above zero and the calculated slippage is above the first lowest predetermined slippage but below a second lowest predetermined slippage, the sixth means selects one of the maps at page 13 or whose page number is incremented from that used in the first case, in a third case when the change rate of the first speed is equal to or above zero and the calculated slippage is increased and exceeds the second lowest predetermined slippage, the sixth means selects one of the maps at page 19 or whose page number is incremented from that used in the third case, in a fourth case when the change rate of the first speed is below zero and the calculated slippage increases and exceeds a highest predetermined slippage, the sixth means selects a predetermined value corresponding to 5% of the opening angle of the second throttle valve, and in a fifth case when the change rate is below zero and the calculated slippage is decreased and becomes below the highest predetermined slippage, the sixth means selects one of the maps whose page number is decremented from that used in the fourth case with time so that the opening angle of the second throttle valve is stepwise increased, and in a sixth case when the change rate of the first speed is below zero and the calculated slippage is decreased and becomes below a fourth lowest predetermined slippage, the sixth means selects one of the maps whose page number is page 0 or whose page number is decremented from that used in the fifth case whenever a predetermined time has elapsed.

8. A system as set forth in claim 7, wherein the four predetermined slippages are set according to characteristics of the vehicular engine and vehicle.

9. A system as set forth in claim 8, wherein the four predetermined slippages are 0.1, 0.2, 0.3 and 0.1.

10. A system as set forth in claim 5, which further comprises thirteenth means for biasing the second throttle valve toward its fully open position.

11. A system as set forth in claim 1, wherein the second means comprises eighth means for detecting a left driven wheel speed and ninth means for detecting a right driven wheel speed and wherein the second means calculates the second speed from an average speed of the left and right driven wheel speeds.

12. A system as set forth in claim 1, wherein the first means comprises a drive shaft rotation sensor for detecting a rotation of the drive shaft of the vehicle.

13. A system for controlling rotation of drive wheels for a vehicle, comprising:

(a) first means for detecting a first speed of the drive wheels of the vehicle;

(b) second means for detecting a second speed of a vehicle body;

(c) third means for calculating a slip rate between the drive wheels and a road surface on which the vehicle runs from the detected first and second speeds;

(d) forth means for storing numerical information which represents a plurality of different characteristic graphs, each of the graphs representing a relationship between an opening angle of a first throttle valve installed in an intake air passage of a vehicular engine which is varied according to a depression angle of an accelerator of the vehicle and an opening angle of a second throttle valve installed in series with the first throttle valve;

(e) fifth means for storing a plurality of different predetermined slippages, each representing a magnitude of the slip occurrence;

(f) sixth means for selecting one of the characteristic graphs depending on whether the calculated slippage increases and exceeds one of the predetermined slippages such that the opening angle of the second throttle valve is largely decreased with respect to the opening angle of the first throttle valve whenever the slippage increases and exceeds the predetermined slippage and such that the opening angle of the second throttle valve is stepwise increased with time whenever the calculated slippage is decreased and becomes below one of the predetermined slippages; and (g) seventh means for controlling the opening angle of the second throttle valve on the basis of the selected characteristic graph so that a frictional force between the drive wheels and road surface becomes maximum so that rotation of drive wheels is controlled.

14. A method for controlling rotation of drive wheels for a vehicle, comprising the steps of:

(a) detecting a first speed of the drive wheels of the vehicle;

(b) detecting a second speed of a vehicle body;

(c) calculating slippage between the drive wheels and a road surface on which the vehicle runs from the detected first and second speeds;

(d) storing numerical information which represents a plurality of different characteristic graphs each representing a relationship between a first controlled variable of a first engine driving force adjusting mechanism of a vehicular engine which is varied according to a controlled variable of an accelerator of the vehicle and a second controlled variable of a second engine driving force adjusting mechanism of the vehicular engine;

(e) storing a plurality of different predetermined slippages each representing a magnitude of slippage;

(f) selecting one of the characteristic graphs depending on whether the calculated slippage increases and exceeds one of the set predetermined slippages such that the second controlled variable is decreased with respect to the first controlled variable whenever the slippage increases and exceeds one of the set predetermined slippages and such that the second controlled variable is increased with time with respect to the first controlled variable whenever the calculated slippage in turn decreases and becomes below one of the predetermined slippages; and (g) controlling the second controlled variable of the second driving force adjusting mechanism on the basis of the selected characteristic graph so that rotation of drive wheels is controlled.

* * * * *